United States Patent
Hong et al.

(10) Patent No.: US 11,819,963 B1
(45) Date of Patent: Nov. 21, 2023

(54) SHARED MOLD MANUFACTURING METHOD FOR INDUSTRIAL LIGHTING DEVICES

(71) Applicant: Xiamen PVTECH Co., Ltd., Fujian (CN)

(72) Inventors: Haibo Hong, Fujian (CN); Fuxing Lu, Fujian (CN); Liangliang Cao, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 0 days.

(21) Appl. No.: 18/201,194

(22) Filed: May 24, 2023

(30) Foreign Application Priority Data

Jan. 16, 2023 (CN) .......................... 202310075318.5

(51) Int. Cl.
  *B23P 15/00* (2006.01)
  *F21V 29/89* (2015.01)
  *F21V 15/01* (2006.01)

(52) U.S. Cl.
  CPC .............. *B23P 15/00* (2013.01); *F21V 15/01* (2013.01); *F21V 29/89* (2015.01); *B23P 2700/10* (2013.01)

(58) Field of Classification Search
  CPC .... B22D 19/009; B23P 15/00; B23P 2700/10; Y10T 29/4935; Y10T 29/49988; Y10T 29/49989
  See application file for complete search history.

(56) References Cited

U.S. PATENT DOCUMENTS

| | | | | |
|---|---|---|---|---|
| 6,305,464 B1* | 10/2001 | Smalen | ............... | H01L 21/4878 165/185 |
| 8,851,711 B2* | 10/2014 | Ladewig | ............... | F21V 29/713 362/249.02 |
| 8,944,637 B2* | 2/2015 | Spiro | ...................... | F21S 8/026 165/185 |
| 10,604,275 B2* | 3/2020 | Jha | ......................... | F21S 45/48 |
| 10,914,531 B2* | 2/2021 | Chuang | .................... | B22C 9/02 |
| 11,493,190 B2* | 11/2022 | Spiro | ........................ | F21S 8/04 |
| 2011/0226458 A1* | 9/2011 | Plonski | ............... | H01L 21/4882 165/185 |
| 2012/0193085 A1* | 8/2012 | Whittle | ............... | H01L 25/0655 165/185 |
| 2021/0156625 A1* | 5/2021 | Chuang | .................. | H02K 15/14 |

* cited by examiner

*Primary Examiner* — Jason L Vaughan
(74) *Attorney, Agent, or Firm* — Winston Hsu

(57) ABSTRACT

A shared mold manufacturing method for industrial lighting devices includes the following steps: putting a metal material in a mold to execute a casting molding step to generate a semi-finished product; the semi-finished product has a plate portion and a box portion disposed on the plate portion; taking the semi-finished product from the mold and performing a cooling step to cool the semi-finished product; performing a separating step to separate the plate portion from the box portion; executing a re-processing step for the plate portion and the box portion in order to obtain a heat sink and a driver; and performing a combining step to combine the heat sink with the driver.

10 Claims, 9 Drawing Sheets

SHARED MOLD MANUFACTURING METHOD FOR INDUSTRIAL LIGHTING DEVICES

BACKGROUND OF THE INVENTION

1. Field of the Invention

The present invention relates to a method for manufacturing industrial lighting devices, in particular to a shared mold manufacturing method for manufacturing industrial lighting devices.

2. Description of the Prior Art

With development of industry, the demand for industrial lighting devices (such as mining lamps, explosion-proof lamps, etc.) used in mines, oil fields and factories has gradually increased. Some currently available industrial lighting devices adopt the separated-type design. The separated-type design means that the heat sink and the driver need to be manufactured by different molds, which greatly increases the manufacturing cost. Some currently available industrial lighting devices adopt the integrated-type design. The integrated-type design means that the heat sink and driver are manufactured by the same mold. However, if the driver malfunctions, the lighting device cannot be repaired. Therefore, the user can only replace the lighting device with another lighting device, which greatly increases the maintenance cost.

The product information of the currently available industrial lighting device is recorded on the user manual. The user manual is usually placed in the packaging box of the lighting device. Therefore, if the user accidently loses the user manual, the user can only search for the product information through the Internet or ask for it from the manufacturer (or dealer), which is inconvenient for the user and will influence the user experience.

SUMMARY OF THE INVENTION

One embodiment of the present invention provides a shared mold manufacturing method for industrial lighting devices includes the following steps: putting a metal material in a mold to execute a casting molding step to generate a semi-finished product; the semi-finished product has a plate portion and a box portion disposed on the plate portion; taking the semi-finished product from the mold and performing a cooling step to cool the semi-finished product; performing a separating step to separate the plate portion from the box portion; executing a re-processing step for the plate portion and the box portion in order to obtain a heat sink and a driver; and performing a combining step to combine the heat sink with the driver.

In one embodiment, the method further includes the following step: performing a pre-processing step to remove the slag packets and scraps of the semi-finished product.

In one embodiment, the method further includes the following step: fixing a nameplate on the heat sink.

In one embodiment, the method further includes the following step: forming a barcode on the nameplate.

In one embodiment, the barcode is a one-dimensional barcode, two-dimensional barcode or three-dimensional barcode.

In one embodiment, the separating step is stamping or computer numerical control tool machining.

In one embodiment, the re-processing step includes one or more of drilling, tapping or painting.

In one embodiment, the step of executing the re-processing step for the plate portion and the box portion in order to obtain the heat sink and the driver further includes the following step: forming the driver including a rectangular substrate having a plurality of fixing hole, an upper housing and a lower housing; the upper housing and the low housing are disposed on the upper surface and the lower surface of the rectangular substrate respectively; and forming the heat sink having a central hole and a plurality of fixing posts disposed around the central hole, wherein the shape of the central hole is corresponding to the shape of the rectangular substrate.

In one embodiment, the step of performing the combining step to combine the heat sink with the driver further includes the following step: making a plurality of fixing elements penetrate through the fixing hole and the fixing posts respectively in order to fix the driver with the heat sink; the driver is suspended over the heat sink.

In one embodiment, the metal material is an aluminum alloy.

The shared mold manufacturing method for industrial lighting devices in accordance with the embodiments of the present invention may have the following advantages:

(1) In one embodiment of the present invention, the method can execute a casting molding step to form a semi-finished product having a plate portion and a box portion via a mold, perform a separating step to separate the plate portion and the box portion, and then execute a combining step to combine the heat sink with the driver. The above manufacturing process can manufacture the heat sink and the driver by the common mold, which can greatly reduce the manufacturing cost of the industrial lighting device in order to enhance the market competitiveness of the industrial lighting device. Thus, the industrial lighting device can satisfy the needs of market.

(2) In one embodiment of the present invention, the method can execute the casting molding step to form the semi-finished product having the plate portion and the box portion via the mold, perform the separating step to separate the plate portion and the box portion, and then execute the combining step to combine the heat sink with the driver. Accordingly, when the driver of the industrial lighting device malfunctions, the user can replace the driver by another one or repair the driver, which can greatly reduce the maintenance cost of the industrial lighting device. Thus, the industrial lighting device can definitely meet actual requirements.

(3) In one embodiment of the present invention, the method can add a nameplate to the industrial lighting device, which can enhance the overall visual effect of the industrial lighting device. Therefore, the above structural design can significantly enhance the overall look of the industrial lighting device in order to improve the user experience and user satisfaction.

(4) In one embodiment of the present invention, the method can add the nameplate to the industrial lighting device and the nameplate can be provided with a barcode (e.g., one-dimensional barcode, two-dimensional barcode, three-dimensional barcode, etc.). Therefore, the user can scan the barcode by an electronic device (e.g., smart phone, tablet computer, etc.) in order to swiftly obtain the product information or other relevant information of the industrial lighting device. As a result, the user can conveniently and efficiently install the industrial lighting device even if the user loses the user manual. Thus, the industrial lighting device can further enhance the user experience.

(5) In one embodiment of the present invention, the method can reduce the manufacturing cost and maintenance cost of the industrial lighting device, which can increase the popularity of the industrial lighting device. Therefore, the industrial lighting device can be more comprehensive in use.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
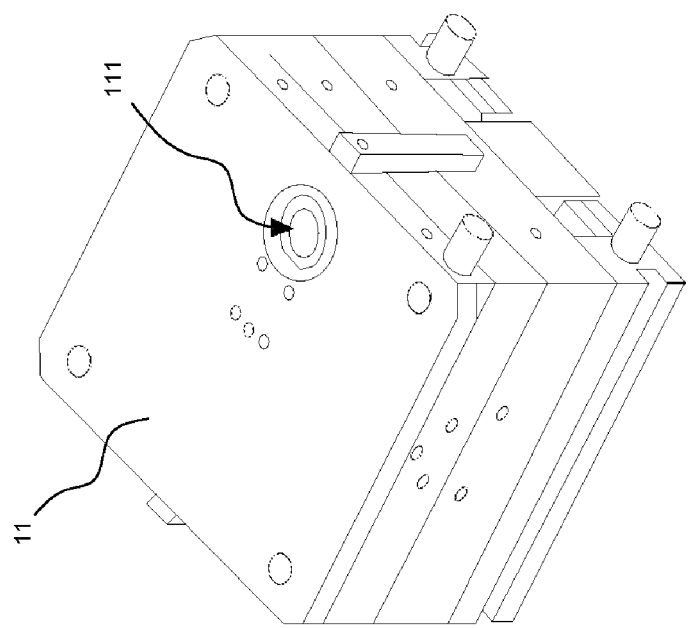
FIG. 1 is a first schematic view of a shared mold manufacturing method for industrial lighting devices in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1-FIG. 5, which are first~fifth schematic views of a shared mold manufacturing method for industrial lighting devices in accordance with one embodiment of the present invention respectively. The shared mold manufacturing method in this embodiment can be used to manufacturing industrial lighting devices (e.g., mining lamps, explosion-proof lamps, etc.) suitable for hazardous workplaces (e.g., mines, oil fields, factories, etc.). As shown in FIG. 1, the first step is to put a metal material into a mold 11 via the feed inlet 111 of the mold 11 in order to execute a casting molding step. In one embodiment, the metal material may be aluminum or other currently available metal materials.

Figure 2:
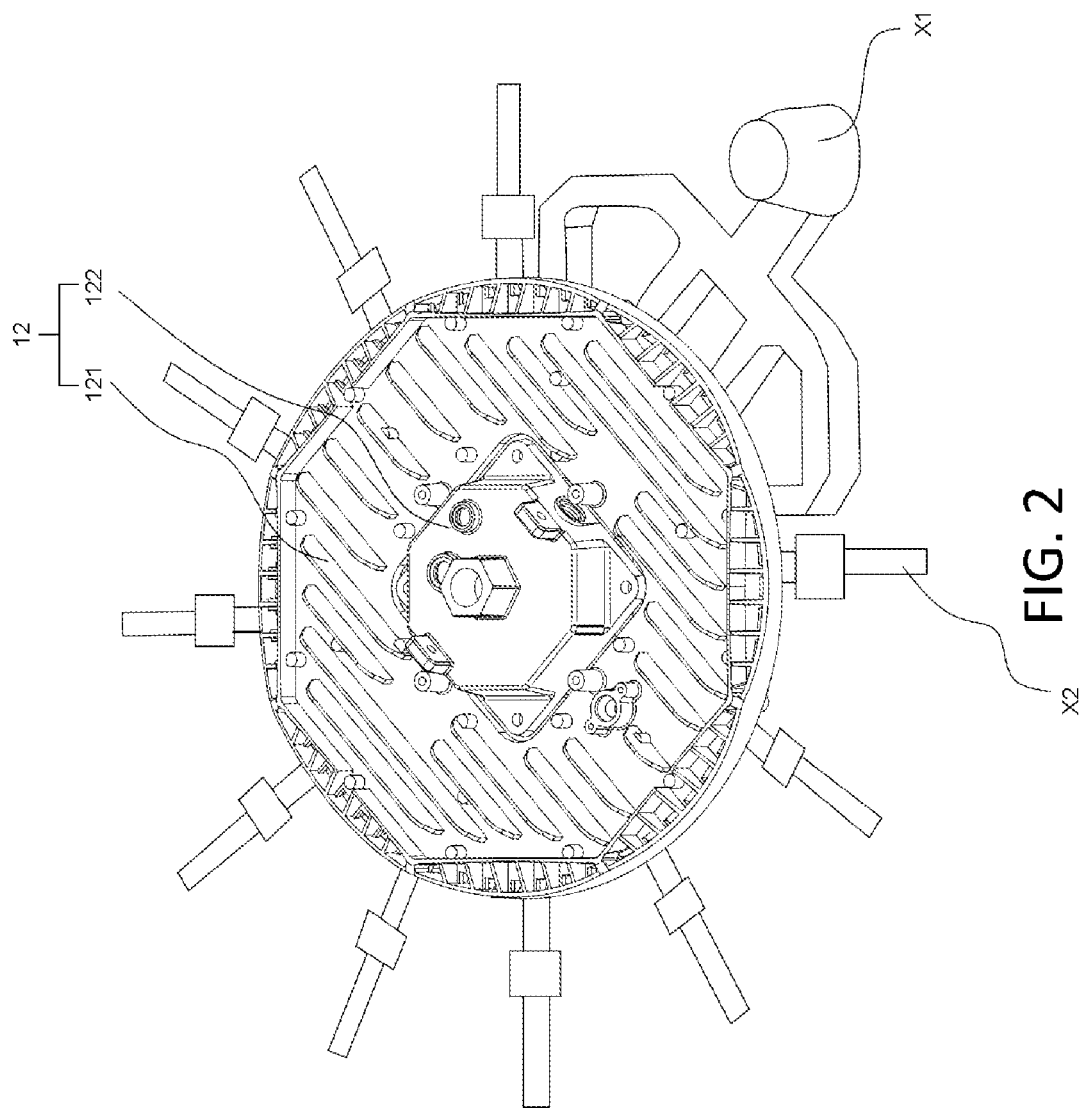
FIG. 2 is a second schematic view of the shared mold manufacturing method for industrial lighting devices in accordance with one embodiment of the present invention.

As shown in FIG. 2, the aforementioned casting molding step can generate a semi-finished product 12. Afterward, the second step is to take the semi-finished product 12 from the mold 11 and then perform a cooling step to cool the semi-finished product 12. The structure of the mold 11 can make the semi-finished product has a plate portion 121 and a box portion 122. The box portion 122 is disposed on the plate portion 121.

Figure 3:
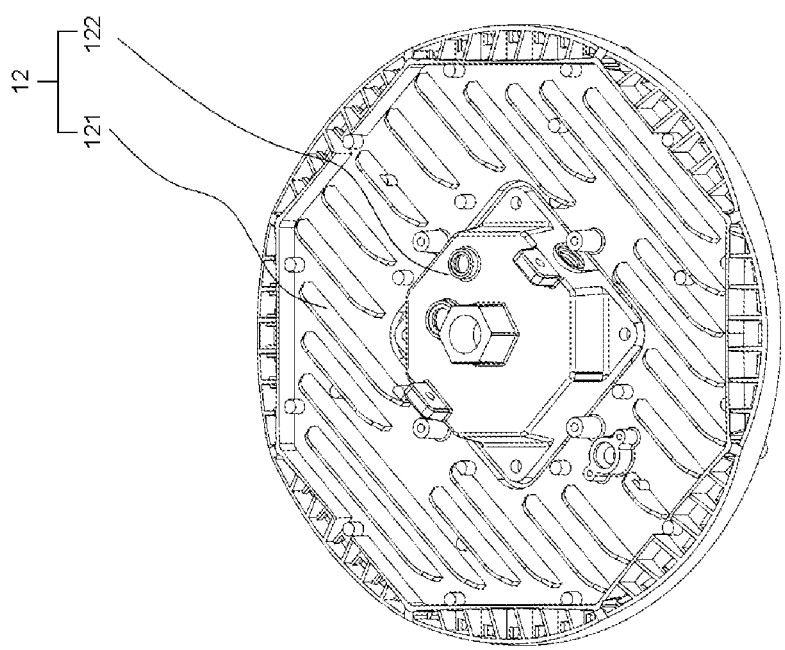
FIG. 3 is a third schematic view of the shared mold manufacturing method for industrial lighting devices in accordance with one embodiment of the present invention.

As shown in FIG. 3, the third step is to perform a pre-processing step to remove the scraps X1 and slag packets X2 of the semi-finished product 12. In one embodiment, the pre-processing step can be executed by a machine, such as stamping or computer numerical control tool machining.

Figure 4:
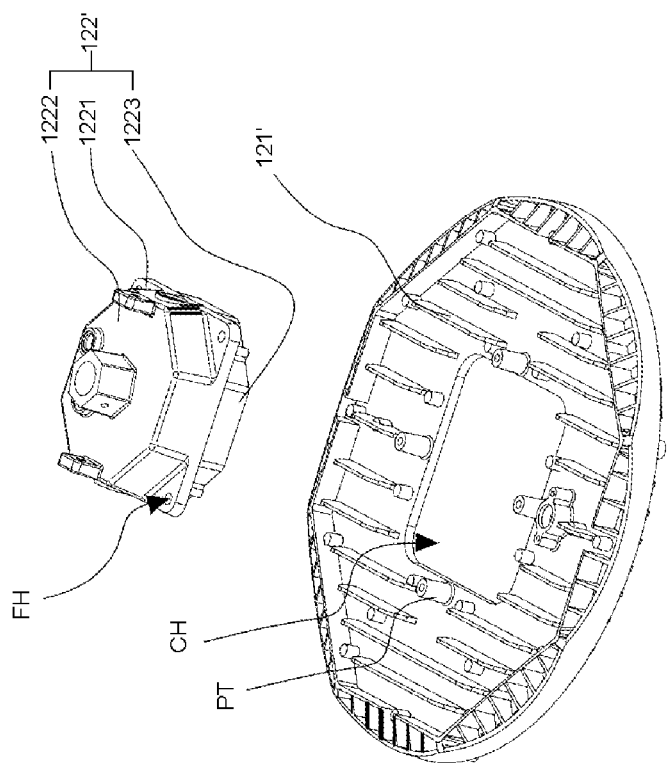
FIG. 4 is a fourth schematic view of the shared mold manufacturing method for industrial lighting devices in accordance with one embodiment of the present invention.

As shown in FIG. 4, the fourth step is a separating step, which can separate the plate portion 121 of the semi-finished product 12 from the box portion 122 thereof. In one embodiment, the separating step can be also executed by a machine, such as stamping or computer numerical control tool machining. Next, the fifth step is to perform a re-processing step for the plate portion 121 and the box portion 122 in order to obtain a heat sink 121' an a driver 122'. In one embodiment, the re-processing step includes one or more of drilling, tapping or painting so as to form the heat dissipation fins, screw holes, stubs, fixing plates or other necessary elements. The structures of the heat sink 121' and driver 122' can be changed according to actual requirements.

In this embodiment, the driver 122' can have a rectangular substrate 1221, an upper housing 1222 and a lower housing 1223. The rectangular substrate 1221 may be square, rectangular or rhombic. The upper housing 1222 and lower housing 1223 are disposed on the upper surface and lower surface of the rectangular substrate 1221 respectively. The rectangular substrate 1221 has a plurality of fixing holes FH disposed at the four corners of the rectangular substrate 1221 respectively. The heat sink 121' has a central hole CH and a plurality of fixing posts PT. The shape of the central hole CH is corresponding to that of the rectangular substrate 1221. The fixing posts PT are disposed around the central hole CH. In this embodiment, each of the fixing posts PT is disposed at the position adjacent to the central point of one side of the central hole CH.

Figure 5:
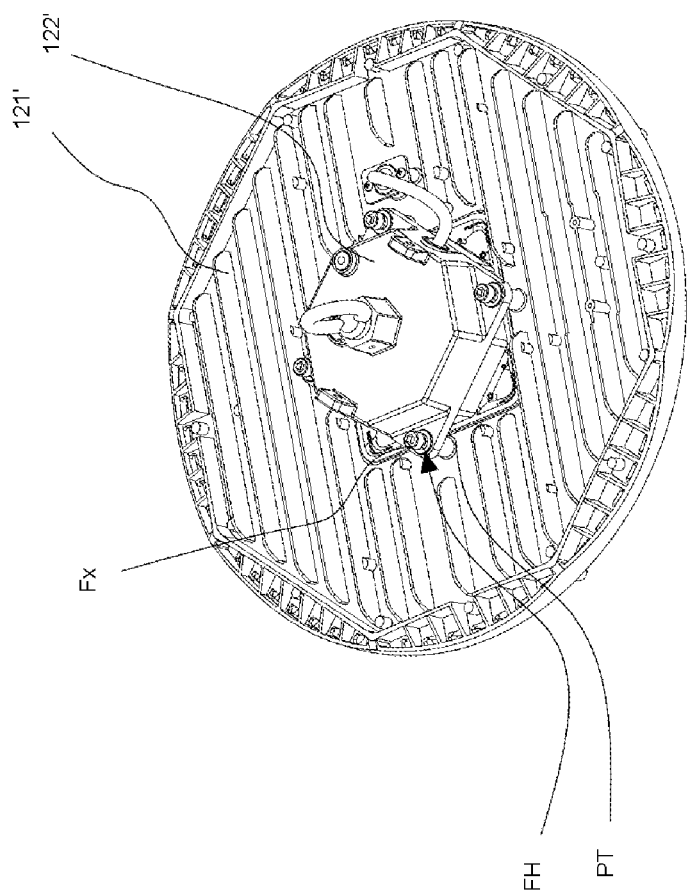
FIG. 5 is a fifth schematic view of the shared mold manufacturing method for industrial lighting devices in accordance with one embodiment of the present invention.

As shown in FIG. 5, the last step is a combining step, which can combine the heat sink 121' with the driver 122' so as to obtain a module integrating the heat sink 121' with the drive 122'. In this embodiment, the fixing elements Fx can penetrate through the fixing holes FH and fixing posts PT in order to fix the driver 122' with the heat sink 121'. Thus, the driver 122' can be suspended over the heat sink 121'. The structural designs of the heat sink 121' and the driver 122' allows the heat sink 121' to be easily combined with the driver 122' to form the module integrating the heat sink 121' with the driver 122' after the separating step. Afterward, a packaging step can be performed to package the above module.

The embodiment just exemplifies the present invention and is not intended to limit the scope of the present invention; any equivalent modification and variation according to the spirit of the present invention is to be also included within the scope of the following claims and their equivalents.

As set forth above, the shared mold manufacturing method of this embodiment can execute the casting molding step to form the semi-finished product 12 having the plate portion 121 and the box portion 122 by the shared mold 11, and then execute the separating step to separate the plate portion 121 from the box portion 122. Finally, the method performs the combining step to combine the heat sink 121' with the driver 122' the above manufacturing flow can manufacture the heat sink 121' and the driver 122' of an industrial lighting device by one shared mold 11. In this way, the manufacturing cost of the industrial lighting device can be effectively reduced in order to enhance the market competitiveness of the industrial lighting device. Accordingly, the industrial lighting device manufactured by this method can satisfy the needs of market.

In addition, when the driver 122' of the industrial lighting device malfunctions, the user can directly remove the driver 122' in order to maintain or repair the driver 122', so the industrial lighting device can normally operate. Accordingly, the industrial lighting device manufactured by this method can definitely meet actual requirements.

As a result, the industrial lighting device manufactured by this method has the advantages of prior art, but has no the shortcomings of prior art. This manufacturing method can achieve the desired technical effects by lower cost.

In another embodiment, the industrial lighting device can be further provided with a nameplate. The nameplate can improve the overall look of the industrial lighting device. Further, the nameplate can have a barcode (e.g., one-dimensional barcode, two-dimensional barcode, three-dimensional barcode, etc.), so the user can scan the barcode by an electronic device (e.g., smart phone, tablet computer, etc.) in order to swiftly obtain the product information or other relevant information of the industrial lighting device. As a result, the user can conveniently and efficiently install the industrial lighting device even if the user loses the user manual. Thus, the industrial lighting device can further enhance the user experience and user satisfaction.

The embodiment just exemplifies the present invention and is not intended to limit the scope of the present invention; any equivalent modification and variation according to the spirit of the present invention is to be also included within the scope of the following claims and their equivalents.

Figure 6:
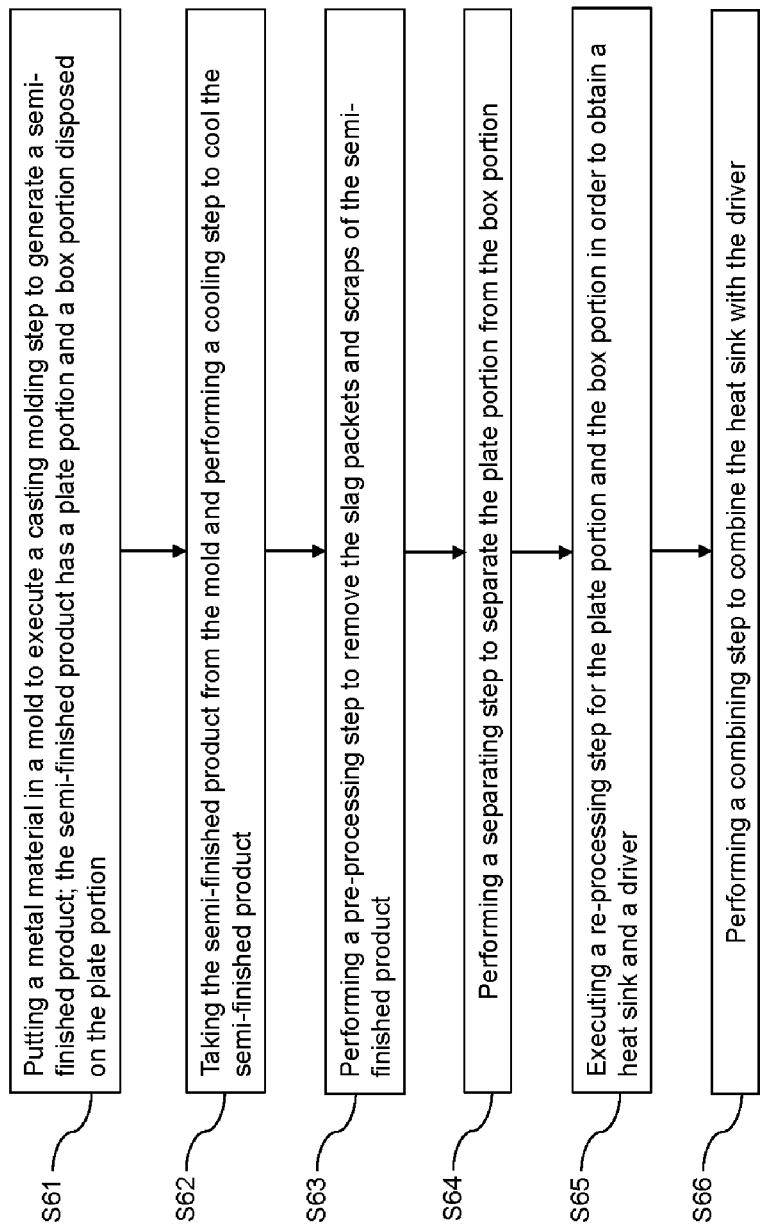
FIG. 6 is a flow chart of the shared mold manufacturing method for industrial lighting devices in accordance with one embodiment of the present invention.

Please refer to FIG. 6, which is a flow chart of the shared mold manufacturing method for industrial lighting devices in accordance with one embodiment of the present invention. As shown in FIG. 6, the shared mold manufacturing method for industrial lighting devices according to this embodiment of the present invention includes the following steps:

Step S61: putting a metal material in a mold to execute a casting molding step to generate a semi-finished product; the semi-finished product has a plate portion and a box portion disposed on the plate portion.

Step S62: taking the semi-finished product from the mold and performing a cooling step to cool the semi-finished product.

Step S63: performing a pre-processing step to remove the slag packets and scraps of the semi-finished product.

Step S64: performing a separating step to separate the plate portion from the box portion.

Step S65: executing a re-processing step for the plate portion and the box portion in order to obtain a heat sink and a driver. The re-processing step can form the driver 122' including the rectangular substrate 1221 having the fixing holes FH, the upper housing 1222 and the lower housing 1223. The upper housing 1222 and the low housing 1223 are disposed on the upper surface and the lower surface of the rectangular substrate 1221 respectively. In addition, the re-processing step can form the heat sink 121' having the central hole CH and the fixing posts PT disposed around the central hole CH. The shape of the central hole CH is corresponding to the shape of the rectangular substrate 1221.

Step S66: performing a combining step to combine the heat sink with the driver. Via the combining step, the fixing elements Fx can penetrate through the fixing holes FH and fixing posts PT in order to fix the driver 122' with the heat sink 121'. Thus, the driver 122' can be suspended over the heat sink 121'. In one embodiment, the fixing elements Fx may be screws or other similar elements. Afterward, a packaging step can be performed to package the above module.

The embodiment just exemplifies the present invention and is not intended to limit the scope of the present invention; any equivalent modification and variation according to the spirit of the present invention is to be also included within the scope of the following claims and their equivalents.

It is worthy to point out that some currently available industrial lighting devices adopt the separated-type design. The separated-type design means that the heat sink and the driver need to be manufactured by different molds, which greatly increases the manufacturing cost. Besides, the product information of the currently available industrial lighting device is recorded on the user manual. The user manual is usually placed in the packaging box of the lighting device. Therefore, if the user accidently loses the user manual, the user can only search for the product information through the Internet or ask for it from the manufacturer (or dealer), which is inconvenient for the user and will influence the user experience. On the contrary, according to one embodiment of the present invention, the method can execute a casting molding step to form a semi-finished product having a plate portion and a box portion via a mold, perform a separating step to separate the plate portion and the box portion, and then execute a combining step to combine the heat sink with the driver. The above manufacturing process can manufacture the heat sink and the driver by the common mold, which can greatly reduce the manufacturing cost of the industrial lighting device in order to enhance the market competitiveness of the industrial lighting device. Thus, the industrial lighting device can satisfy the needs of market.

Also, according to one embodiment of the present invention, the method can execute the casting molding step to form the semi-finished product having the plate portion and the box portion via the mold, perform the separating step to separate the plate portion and the box portion, and then execute the combining step to combine the heat sink with the driver. Accordingly, when the driver of the industrial lighting device malfunctions, the user can replace the driver by another one or repair the driver, which can greatly reduce the maintenance cost of the industrial lighting device. Thus, the industrial lighting device can definitely meet actual requirements.

Further, according to one embodiment of the present invention, the method can add a nameplate to the industrial lighting device, which can enhance the overall visual effect of the industrial lighting device. Therefore, the above structural design can significantly enhance the overall look of the industrial lighting device in order to improve the user experience and user satisfaction.

Moreover, according to one embodiment of the present invention, the method can add the nameplate to the industrial lighting device and the nameplate can be provided with a barcode (e.g., one-dimensional barcode, two-dimensional barcode, three-dimensional barcode, etc.). Therefore, the user can scan the barcode by an electronic device (e.g., smart phone, tablet computer, etc.) in order to swiftly obtain the product information or other relevant information of the industrial lighting device. As a result, the user can conveniently and efficiently install the industrial lighting device even if the user loses the user manual. Thus, the industrial lighting device can further enhance the user experience.

Furthermore, according to one embodiment of the present invention, the method can reduce the manufacturing cost and maintenance cost of the industrial lighting device, which can increase the popularity of the industrial lighting device. Therefore, the industrial lighting device can be more comprehensive in use. As described above, the industrial lighting device according to the embodiments can definitely achieve great technical effects.

Figure 7:
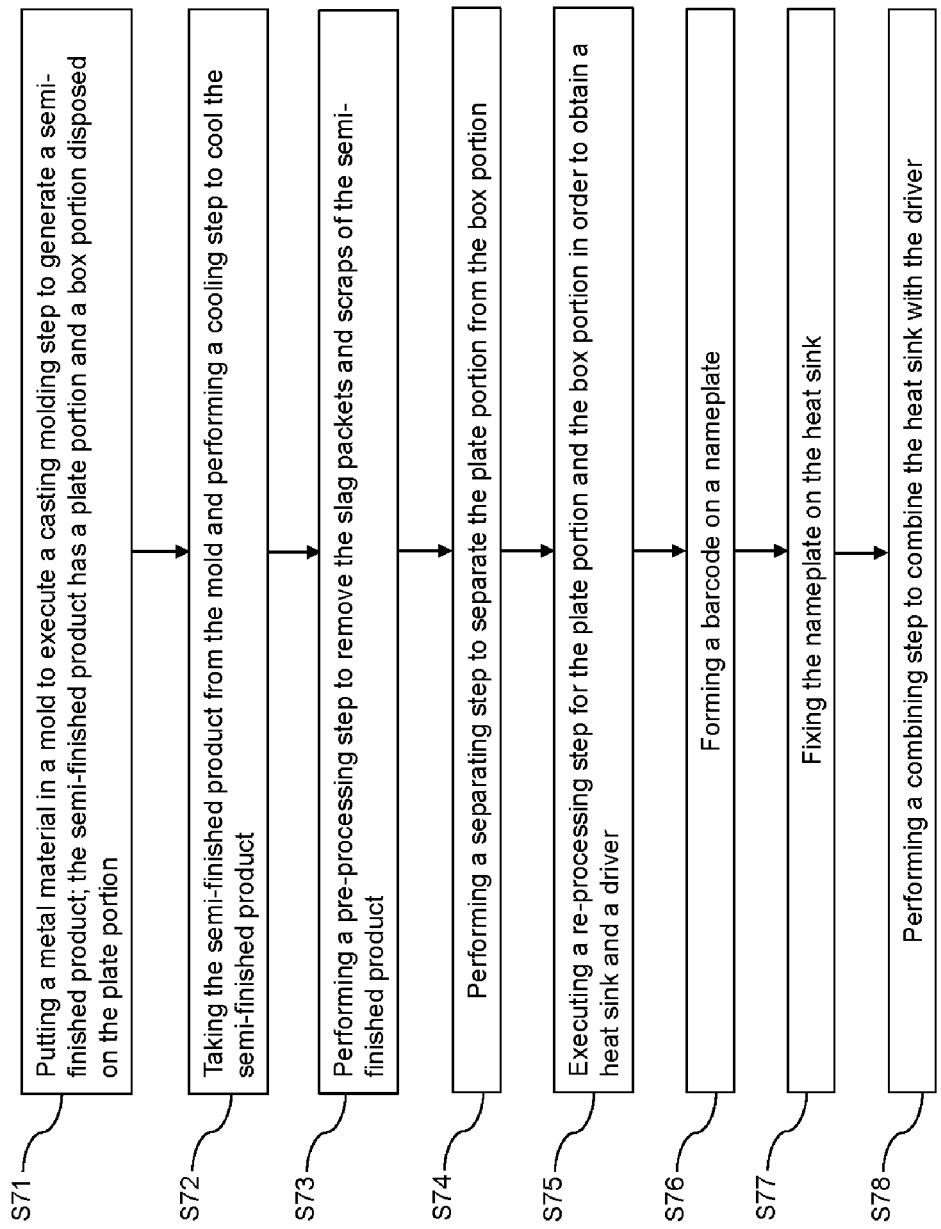
FIG. 7 is a flow chart of a shared mold manufacturing method for industrial lighting devices in accordance with another embodiment of the present invention.
Figure 8:
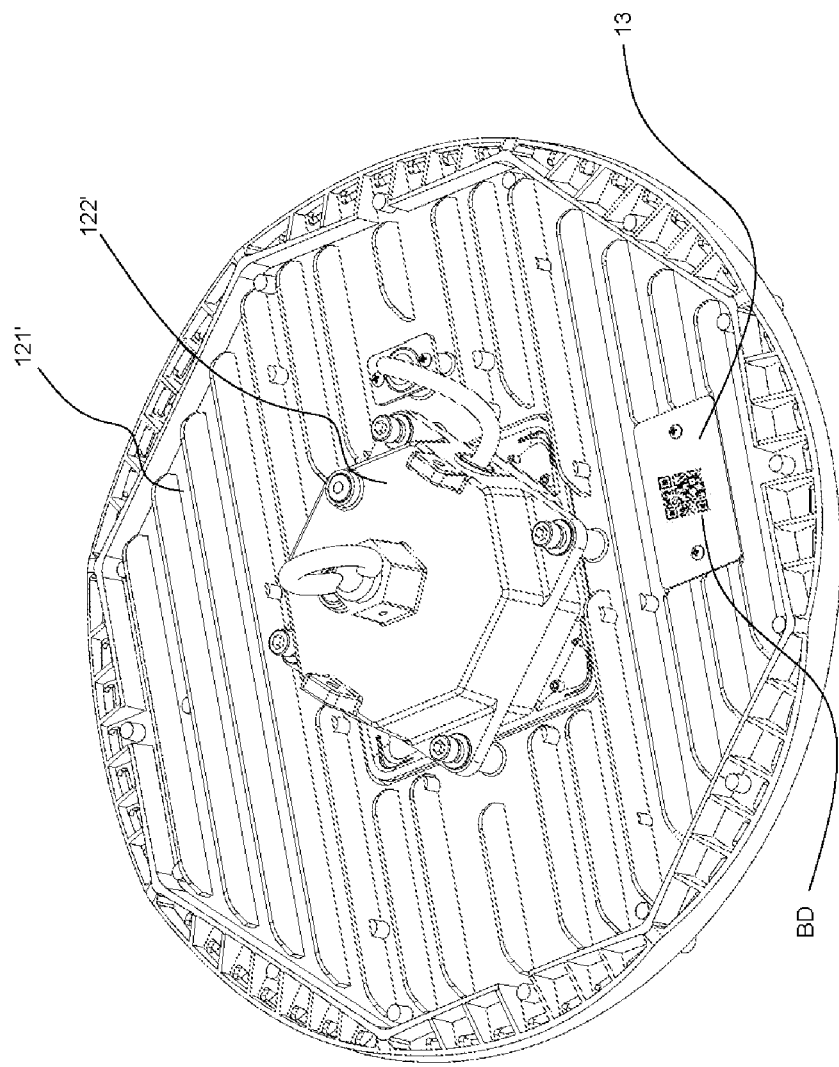
FIG. 8 is a schematic view of the shared mold manufacturing method for industrial lighting devices in accordance with another embodiment of the present invention.

Please refer to FIG. 7 and FIG. 8; please also refer to FIG. 1-FIG. 5. FIG. 7 is a flowchart of a shared mold manufacturing method for industrial lighting devices in accordance with another embodiment of the present invention. FIG. 8 is a schematic view of the shared mold manufacturing method for industrial lighting devices in accordance with another embodiment of the present invention. As shown in FIG. 7 and FIG. 8, the shared mold manufacturing method for industrial lighting devices according to this embodiment of the present invention includes the following steps:

Step S71: putting a metal material in a mold to execute a casting molding step to generate a semi-finished product; the semi-finished product has a plate portion and a box portion disposed on the plate portion.

Step S72: taking the semi-finished product from the mold and performing a cooling step to cool the semi-finished product.

Step S73: performing a pre-processing step to remove the slag packets and scraps of the semi-finished product.

Step S74: performing a separating step to separate the plate portion from the box portion.

Step S75: executing a re-processing step for the plate portion and the box portion in order to obtain a heat sink and a driver. The re-processing step can form the driver 122' including the rectangular substrate 1221 having the fixing holes FH, the upper housing 1222 and the lower housing 1223. The upper housing 1222 and the low housing 1223 are disposed on the upper surface and the lower surface of the rectangular substrate 1221 respectively. In addition, the re-processing step can form the heat sink 121' having the central hole CH and the fixing posts PT disposed around the central hole CH. The shape of the central hole CH is corresponding to the shape of the rectangular substrate 1221.

Step S76: forming a barcode on a nameplate.

Step S77: fixing the nameplate on the heat sink.

Step S78: performing a combining step to combine the heat sink with the driver. Via the combining step, the fixing elements Fx can penetrate through the fixing holes FH and fixing posts PT in order to fix the driver 122' with the heat sink 121'. Thus, the driver 122' can be suspended over the heat sink 121'.

The difference between this embodiment and the previous embodiment is that the method of this embodiment further includes the step of forming the barcode BD on the nameplate 13 and the step of fixing the nameplate 13 on the heat sink 121'. In one embodiment, the barcode may be a one-dimensional barcode, a two-dimensional barcode or a three-dimensional barcode. Then, a packaging step can be performed to package the above module.

The nameplate 13 can enhance the overall visual effect of the industrial lighting device. Therefore, the above structural design can significantly enhance the overall look of the industrial lighting device in order to improve the user experience and user satisfaction.

In addition, the nameplate 13 can further have the barcode BD (e.g., one-dimensional barcode, two-dimensional barcode or three-dimensional barcode, etc.). Therefore, the user can scan the barcode BD by an electronic device (e.g., smart phone, tablet computer, etc.) in order to swiftly obtain the product information or other relevant information of the industrial lighting device. For example, the user can scan the barcode BD by the electronic device (e.g., smart phone, tablet computer, etc.) so as to quickly obtain the product name, product specification, operating current, operating voltage, operating power, manufacturer, contact information of manufacturer, dealer, contact information of dealer, user guide, operating instructions. As a result, the user can conveniently and efficiently install the industrial lighting device even if the user loses the user manual. Thus, the industrial lighting device can further enhance the user experience and user satisfaction.

The embodiment just exemplifies the present invention and is not intended to limit the scope of the present invention; any equivalent modification and variation according to the spirit of the present invention is to be also included within the scope of the following claims and their equivalents.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Figure 9:
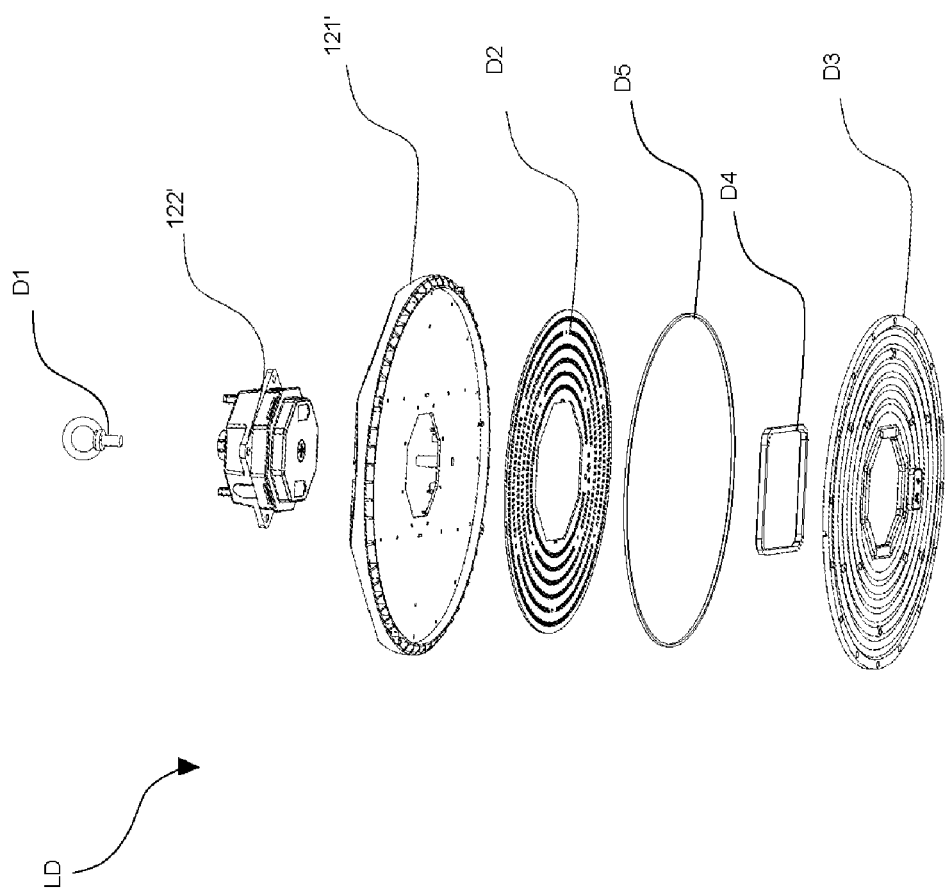
FIG. 9 is an exploded view of the industrial lighting device in accordance with one embodiment of the present invention.

Please refer to FIG. 9, which is an exploded view of the industrial lighting device in accordance with one embodiment of the present invention. As shown in FIG. 9, the industrial lighting device LD includes a ring hook D1, a heat sink 121', a driver 122', a light source board D2, a lens D3, an inner water-proof ring D4 and an outer water-proof ring D5. The heat sink 121' can be combined with the driver 122'. The ring hook D1 is disposed on the driver 122'. The light source board D2 is disposed on the heat sink 121'. The lens D3 is also disposed on the heat sink 121' to cover the light source board D2. The inner water-proof ring D4 and the outer water-proof ring D5 are disposed between the heat sink 121' and the lens D3. The above embodiments illustrate the manufacturing process of only the heat sink 121' and the driver 122'.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the method can execute a casting molding step to form a semi-finished product having a plate portion and a box portion via a mold, perform a separating step to separate the plate portion and the box portion, and then execute a combining step to combine the heat sink with the driver. The above manufacturing process can manufacture the heat sink and the driver by the common mold, which can greatly reduce the manufacturing cost of the industrial lighting device in order to enhance the market competitiveness of the industrial lighting device. Thus, the industrial lighting device can satisfy the needs of market.

Also, according to one embodiment of the present invention, the method can execute the casting molding step to form the semi-finished product having the plate portion and the box portion via the mold, perform the separating step to separate the plate portion and the box portion, and then execute the combining step to combine the heat sink with the driver. Accordingly, when the driver of the industrial lighting device malfunctions, the user can replace the driver by another one or repair the driver, which can greatly reduce the maintenance cost of the industrial lighting device. Thus, the industrial lighting device can definitely meet actual requirements.

Further, according to one embodiment of the present invention, the method can add a nameplate to the industrial lighting device, which can enhance the overall visual effect of the industrial lighting device. Therefore, the above structural design can significantly enhance the overall look of the industrial lighting device in order to improve the user experience and user satisfaction.

Moreover, according to one embodiment of the present invention, the method can add the nameplate to the industrial lighting device and the nameplate can be provided with a barcode (e.g., one-dimensional barcode, two-dimensional barcode, three-dimensional barcode, etc.). Therefore, the user can scan the barcode by an electronic device (e.g., smart phone, tablet computer, etc.) in order to swiftly obtain the product information or other relevant information of the industrial lighting device. As a result, the user can conveniently and efficiently install the industrial lighting device even if the user loses the user manual. Thus, the industrial lighting device can further enhance the user experience.

Furthermore, according to one embodiment of the present invention, the method can reduce the manufacturing cost and maintenance cost of the industrial lighting device, which can increase the popularity of the industrial lighting device. Therefore, the industrial lighting device can be more comprehensive in use.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shared mold manufacturing method for industrial lighting device, comprising:
    putting a metal material in a mold to execute a casting molding step to generate a semi-finished product, wherein the semi-finished product has a plate portion and a box portion disposed on the plate portion;
    taking the semi-finished product from the mold and performing a cooling step to cool the semi-finished product;
    performing a separating step to separate the plate portion from the box portion;
    executing a re-processing step for the plate portion and the box portion in order to obtain a heat sink and a driver; and
    performing a combining step to combine the heat sink with the driver.

2. The shared mold manufacturing method for industrial lighting devices as claimed in claim 1, further comprising:
    performing a pre-processing step to remove slag packets and scraps of the semi-finished product.

3. The shared mold manufacturing method for industrial lighting devices as claimed in claim 1, further comprising:
    fixing a nameplate on the heat sink.

4. The shared mold manufacturing method for industrial lighting devices as claimed in claim 3, further comprising:
    forming a barcode on the nameplate.

5. The shared mold manufacturing method for industrial lighting devices as claimed in claim 4, wherein the barcode is a one-dimensional barcode, two-dimensional barcode or three-dimensional barcode.

6. The shared mold manufacturing method for industrial lighting devices as claimed in claim 1, wherein the separating step is stamping or computer numerical control tool machining.

7. The shared mold manufacturing method for industrial lighting devices as claimed in claim 1, wherein the re-processing step comprises one or more of drilling, tapping or painting.

8. The shared mold manufacturing method for industrial lighting devices as claimed in claim 1, wherein a step of executing the re-processing step for the plate portion and the box portion in order to obtain the heat sink and the driver further comprises:
    forming the driver comprising a rectangular substrate having a plurality of fixing hole, an upper housing and a lower housing, wherein the upper housing and the low housing are disposed on an upper surface and a lower surface of the rectangular substrate respectively; and
    forming the heat sink having a central hole and a plurality of fixing posts disposed around the central hole, wherein a shape of the central hole is corresponding to a shape of the rectangular substrate.

9. The shared mold manufacturing method for industrial lighting devices as claimed in claim 8, wherein a step of performing the combining step to combine the heat sink with the driver further comprises:
    making a plurality of fixing elements penetrate through the fixing hole and the fixing posts respectively in order to fix the driver with the heat sink, whereby the driver is suspended over the heat sink.

10. The shared mold manufacturing method for industrial lighting devices as claimed in claim 1, wherein the metal material is an aluminum alloy.

* * * * *